(12) United States Patent
Chang

(10) Patent No.: US 9,088,761 B2
(45) Date of Patent: Jul. 21, 2015

(54) IMAGE RECORDING SYSTEM, IMAGE RECORDER, AND DATA ACCESSING METHOD

(71) Applicant: VIVOTEK INC., New Taipei (TW)

(72) Inventor: Chien-Wei Chang, New Taipei (TW)

(73) Assignee: VIVOTEK INC., New Taipei (TW)

(*) Notice: Subject to any disclaimer, the term of this patent is extended or adjusted under 35 U.S.C. 154(b) by 58 days.

(21) Appl. No.: 14/060,233

(22) Filed: Oct. 22, 2013

(65) Prior Publication Data

US 2014/0119706 A1   May 1, 2014

(30) Foreign Application Priority Data

Oct. 31, 2012   (TW) .............................. 101140425 A

(51) Int. Cl.
- *H04N 5/92*   (2006.01)
- *H04N 5/84*   (2006.01)
- *H04N 5/89*   (2006.01)
- *H04N 5/77*   (2006.01)
- *H04N 5/907*  (2006.01)

(52) U.S. Cl.
CPC ............... *H04N 5/772* (2013.01); *H04N 5/907* (2013.01)

(58) Field of Classification Search
USPC .................................. 386/224, 332, 334, 335
See application file for complete search history.

(56) References Cited

U.S. PATENT DOCUMENTS

| | | | |
|---|---|---|---|
| 2007/0300037 A1* | 12/2007 | Rogers et al. | 711/202 |
| 2008/0082736 A1* | 4/2008 | Chow et al. | 711/103 |
| 2010/0082890 A1* | 4/2010 | Heo et al. | 711/103 |
| 2010/0262764 A1* | 10/2010 | Liu et al. | 711/103 |
| 2011/0078363 A1* | 3/2011 | Yeh et al. | 711/103 |
| 2011/0305428 A1* | 12/2011 | Hosokawa | 386/230 |
| 2013/0103884 A1* | 4/2013 | Cho | 711/102 |
| 2013/0346671 A1* | 12/2013 | Michael et al. | 711/103 |

* cited by examiner

*Primary Examiner* — Nigar Chowdhury
(74) *Attorney, Agent, or Firm* — Locke Lord LLP; Tim Tingkang Xia, Esq.

(57) ABSTRACT

An image recording system, an image recorder and a data accessing method are provided. Some of memory blocks of a flash memory are set as first blocks, and the other memory blocks are set as second blocks. When a target image file received from a capturing unit of an image reorder is being written into the first blocks, a control unit of the flash memory detects whether the first block into which a processing unit of the image recorder tries to write a piece of data of the target image file is faulty. When the first block is faulty, the control unit selects normal one of the second blocks and then writes the piece of the data of the target image file into the selected second block instead of the first block.

12 Claims, 6 Drawing Sheets

IMAGE RECORDING SYSTEM, IMAGE RECORDER, AND DATA ACCESSING METHOD

CROSS-REFERENCE TO RELATED APPLICATIONS

This non-provisional application claims priority under 35 U.S.C. §119(a) on Patent Application No(s). 101140425 filed in Taiwan, R.O.C. on Oct. 31, 2012, the entire contents of which are hereby incorporated by reference.

TECHNICAL FIELD

The disclosure relates to an electric system, an electric device and a data accessing method, more particularly to an image recording system, an image recorder and a data accessing method.

BACKGROUND

In the past, conventional image recording equipment records images on magnetic tapes. Tapes have finite recording capacity and times. When the conventional tape image recording equipment has recorded images for a long time, a current image may overwrites one previously-recorded image, or when the tape has repeatedly been used, the current image recorded in the tape may be declined. Compared with the conventional image recording equipment, the digital image recording equipment records digital image data in a digital storage device. Therefore, when the digital storage device is repeatedly being used, the digital image data will not be declined. Moreover, image files stored in the digital storage device can be made into lots of copies, and the digital storage device costs less than tapes. Thus, the digital recording equipment is widely applied to various application fields such as home care, security surveillance or vehicle video recording.

Nevertheless, if the digital recording equipment uses a flash memory as its storage device and repeatedly uses the memory blocks of the flash memory, the memory blocks may have faults. For example, a conventional flash memory 120 in FIG. 1 generally has many memory blocks 121 used for storing digital data. When the memory blocks 121 are accessed many times, it is easy for the memory blocks 121 to have faults. These memory blocks 121 having faults are called bad blocks or faulty blocks 122.

In order to avoid writing the image data into the faulty blocks 122, a controller in the flash memory 120, in real time, detects whether the memory block which data is being written to is faulty or not during the data writing. If the memory block is faulty, the controller will find a non-faulty block to logically "replace" the faulty block and write the data into the non-faulty block. Specifically, the faulty blocks are generated more frequent when the recording equipment is used by cyclic recording application then by other applications. However, if the flash memory has run out of capacity and some memory blocks are faulty, the controller in the flash memory 120 will not be able to find available memory blocks to logically "replace" these faulty blocks. Even though the original image data 110 can be written into the flash memory 120, the image data stored in the flash memory will not be the same as the original image data 110. It will be difficult to be read out. Even if the image data stored in the flash memory 120 can be read out, the read-out data will be erroneous, e.g. represented by the dotted-line rectangular in the image data 130 shown in FIG. 1. The image data 130 will not be able to be played, or some part of the displayed image will be wrong or missing.

SUMMARY

An image recording system according to an embodiment of the disclosure includes a flash memory and an image recorder. The flash memory includes a control unit and a plurality of memory blocks and stores a faulty block detection procedure. Some of the memory blocks are set as first blocks, and the other memory blocks are set as second blocks. The image recorder connects to the flash memory and includes a processing unit, a capturing unit and a storage unit. The capturing unit captures an object to output a target image file, and the processing unit connects to the capturing unit and the storage unit and writes the target image file into the first blocks. When the target image file is being written into the flash memory, the control unit performs the faulty block detection procedure to detect whether the first block into which the processing unit tries to write a piece of data of the target image file is faulty. When the first block is faulty, the control unit selects normal one of the second blocks and writes the piece of the data of the target image file into the selected second block instead of the first block.

An image recorder according to an embodiment of the disclosure adapts to access a flash memory which comprises a plurality of memory blocks, and includes a processing unit, a capturing unit and a storage unit. The capturing unit captures an object to output a target image file. The processing unit connects to the capturing unit and the storage unit and writes the target image file into the memory blocks. Some of the memory blocks are set as first blocks into which the processing unit writes the target image file, and the other memory blocks are set as second blocks. When the target image file is being written into the flash memory, the flash memory detects whether the first block into which the processing unit tries to write a piece of data of the target image file is faulty. When the first block is faulty, a control unit in the flash memory selects normal one of the second blocks and then writes the piece of the data of the target image file into the selected second block instead of the first block.

A data accessing method includes the following steps according to an embodiment of the disclosure. Some of memory blocks of a flash memory are set to be first blocks, and the other memory blocks are set to be second blocks. A target image file obtained from an image recorder is written into the first blocks. When the target image file is being written into the flash memory, a control unit of the flash memory detects whether the first block into which a piece of data of the target image file is written is faulty. When the first block is faulty, the control unit selects normal one of the second blocks and then writes the piece of the data of the target image file into the selected second block instead of the first block.

BRIEF DESCRIPTION OF THE DRAWINGS

The present invention will become more fully understood from the detailed description given herein below along with the accompanying drawings which are for illustration only, thus are not limitative of the present invention, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
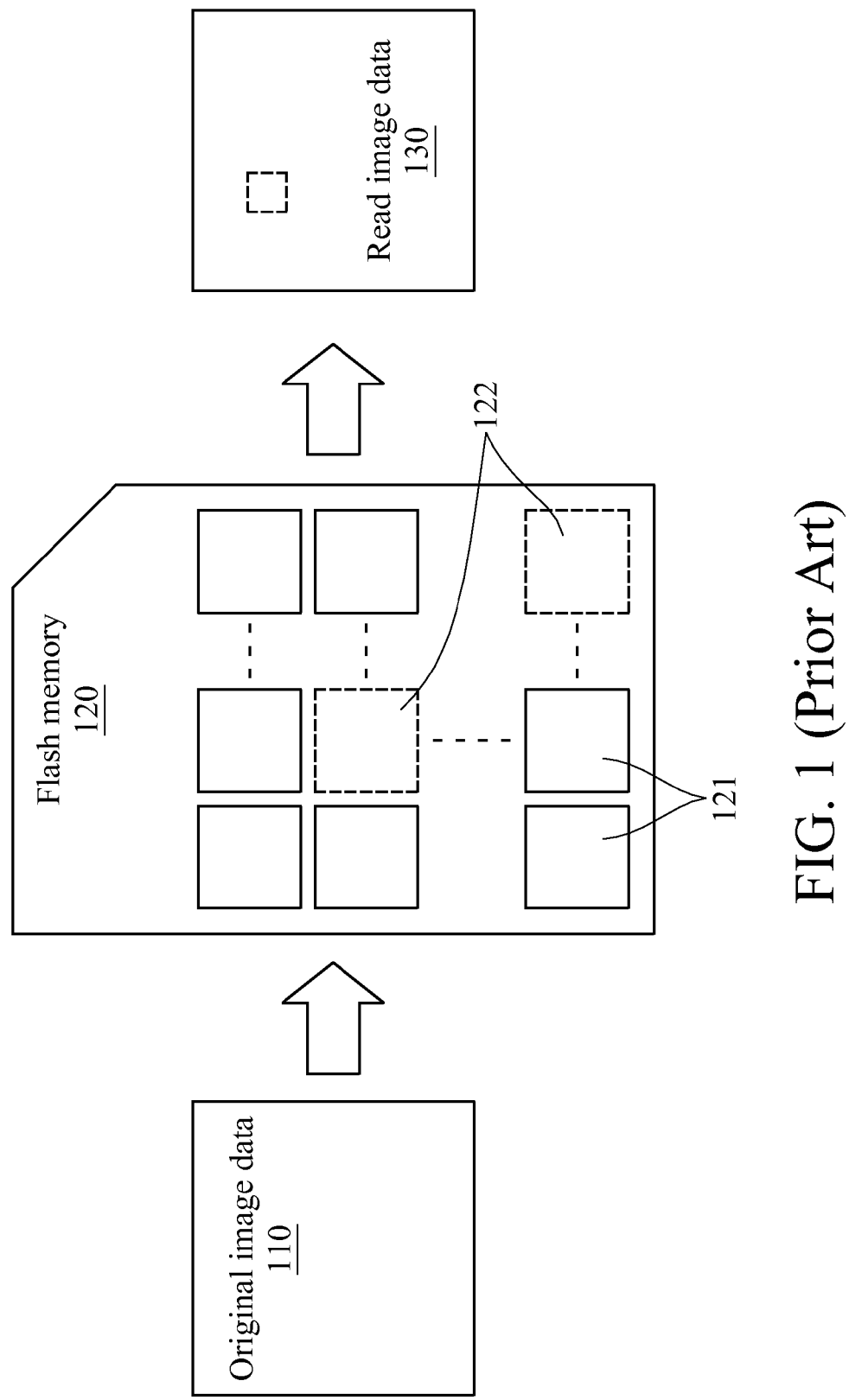
FIG. 1 is a schematic diagram of storing original image data into a flash memory in a conventional embodiment.
Figure 2:
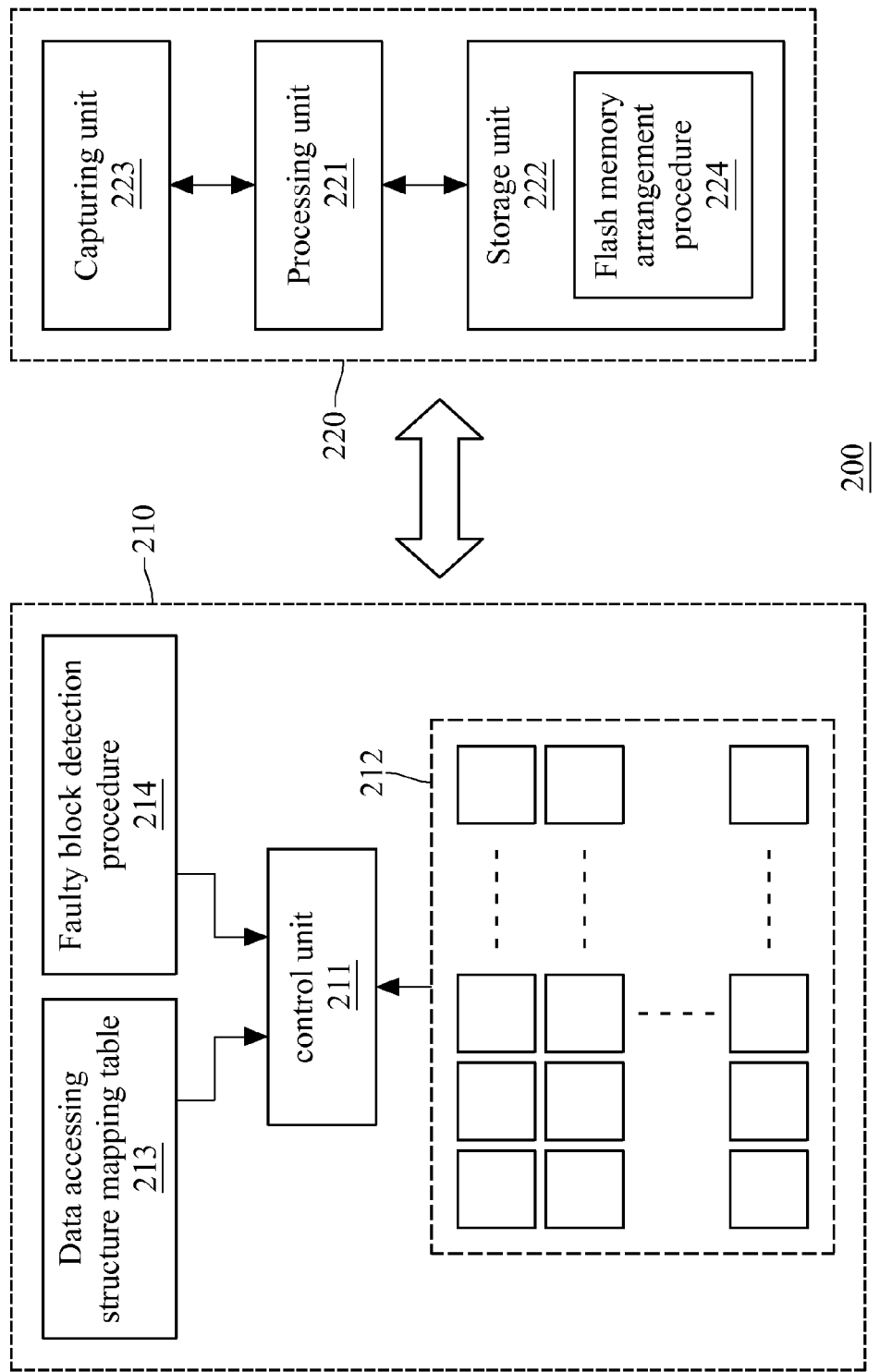
FIG. 2 is a block diagram of an image recording system according to an embodiment of the disclosure.

FIG. 2 is a block diagram of an image recording system according to an embodiment of the disclosure. An image recording system 200 can be applied to street surveillance, home surveillance or vehicle video recording, more particularly to an image recorder capable of unceasingly recording images in a storage device such as a flash memory cyclically. The image recording system 200 includes a flash memory 210 and an image recorder 220.

The flash memory 210 in this and some embodiments can be a flash disk, a secure digital (SD) card, a compact flash (CF) card or other types of memory cards. The flash memory 210 includes a control unit 211 and many memory blocks 212 and stores a data accessing structure mapping table 213 and a faulty block detection procedure 214. The control unit 211 writes data into the memory blocks 212 after receiving the data, and meanwhile records the relations between the written data and the memory blocks 212 into the data accessing structure mapping table 213. Besides, the data accessing structure mapping table 213 records the address of every faulty block.

The image recorder 220 in this and some embodiments can be a personal computer, a mobile phone, a personal digital assistant (PDA), a vehicle video recorder or a surveillance recorder. The image recorder 220 includes a processing unit 221, a storage unit 222 and a capturing unit 223. The processing unit 221 connects to the storage unit 222 and the capturing unit 223. The storage unit 222 stores a flash memory arrangement procedure 224. The capturing unit 223 captures target objects to output target image files which can be static images or dynamic images. The capturing unit 223 can be built in the image recorder 220 or be an external device. If the image recorder 220 is a mobile phone, the capturing unit 223 can be built in the image recorder 220, or if the image recorder 220 is a video recorder host, the capturing unit 223 can be an external camera. Furthermore, the image recorder 220 can have different connection interfaces according to different flash memories 210. If the flash memory 210 is a SD card, the image recorder 220 connects with the flash memory 210 via a SD card connector or a universal serial bus (USB) connector.

Figure 4A:
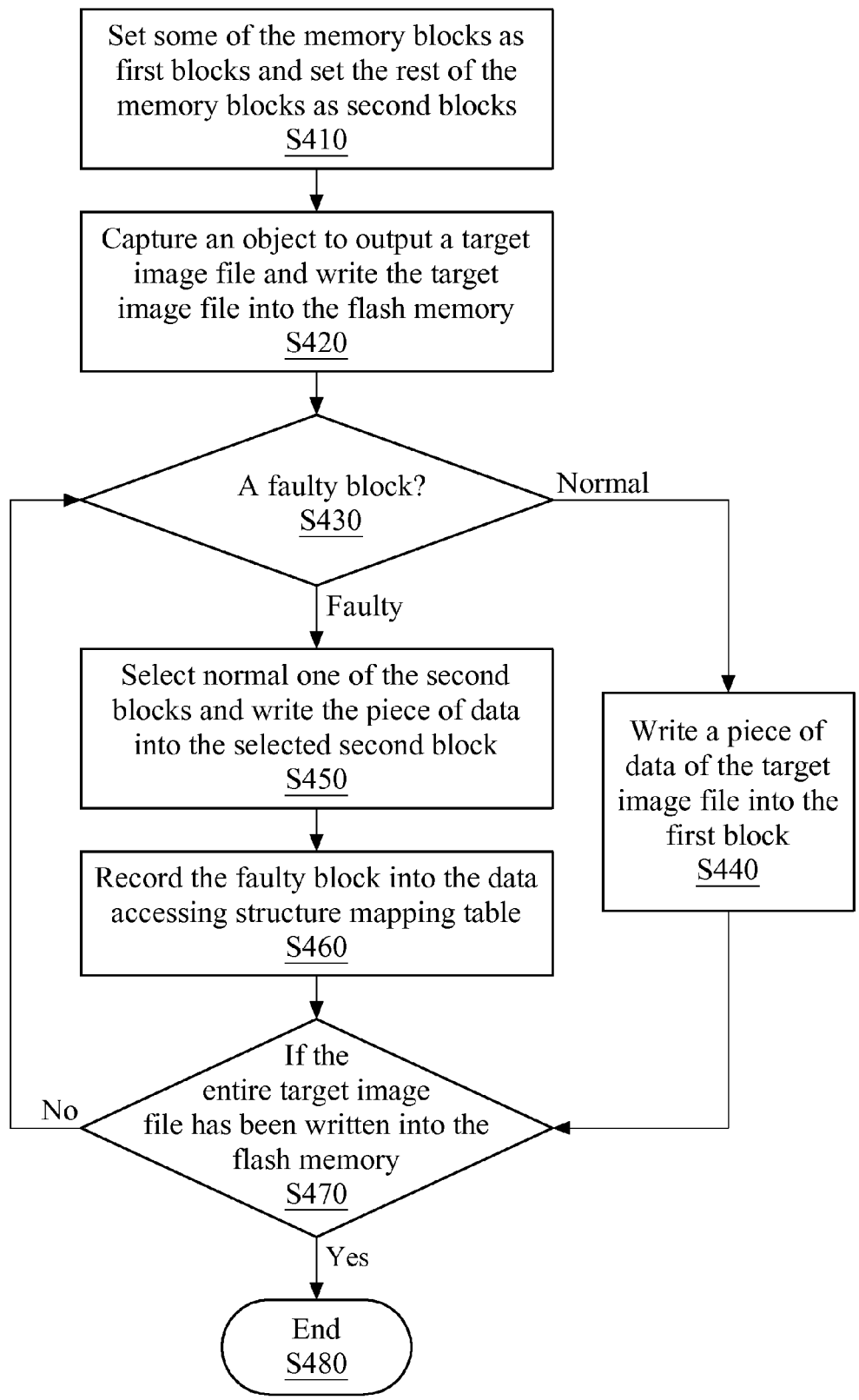
FIG. 4A is a flowchart of a data accessing method according to an embodiment of the disclosure.

FIG. 4A is a flowchart of a data accessing method according to an embodiment of the disclosure. The data accessing method includes the following steps. Firstly, when the flash memory 210 connects to the image recorder 220, the processing unit 221 performs the flash memory arrangement procedure 224 on the flash memory 210 to set some of the memory blocks 212 as first blocks and set the other memory blocks 212 as second blocks (step S410). The detail of the flash memory arrangement procedure 224 is described as follows.

Figure 3A:
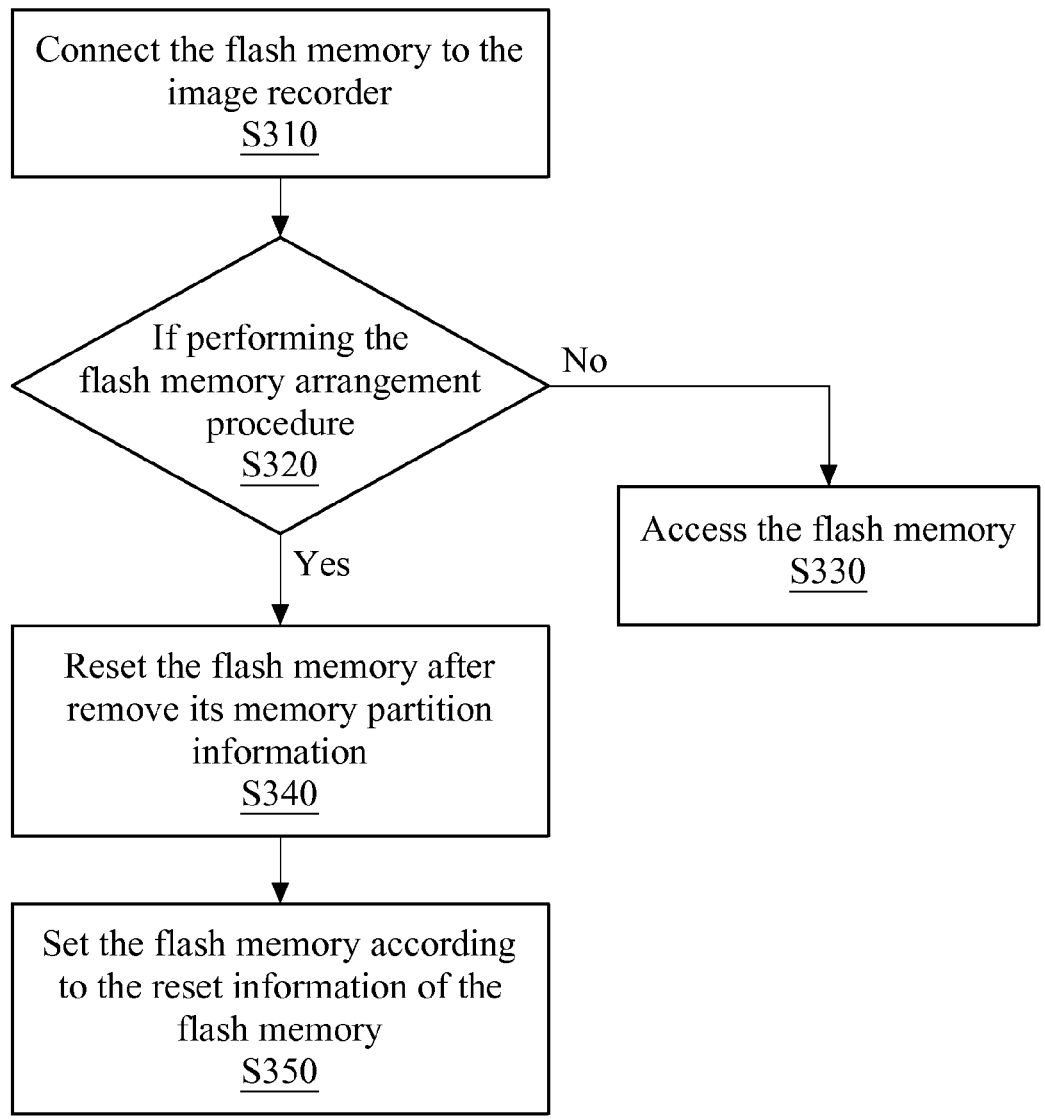
FIG. 3A is a flowchart of a flash memory arrangement procedure according to an embodiment of the disclosure.

Refer to FIG. 3A, the flash memory arrangement procedure 224 is performed to initialize the flash memory 210 and includes the following steps. Firstly, when the flash memory 210 connects to the image recorder 220 (step S310), users can decide whether the processing unit 221 performs the flash memory arrangement procedure 224 on the flash memory 210 (step S320). If being not set to perform the flash memory 210 arrangement procedure on the flash memory 210, the processing unit 221 will start to access the flash memory 210 (step S330); otherwise, the processing unit 221 will remove the memory partition information about the flash memory 210, and then the control unit will further reset the flash memory 210 according to the information stated in the data accessing structure mapping table 213 (step S340). Specifically, the processing unit 221 removes the pervious setting of the memory blocks 212 of the flash memory 210. Then, the processing unit 221 sets the flash memory 210 according to the reset information about the flash memory 210 (step S350). In other words, refer to FIG. 3B, the processing unit 221 defines the total capacity of the first blocks 231 and the total capacity of the second blocks 232 according to the available capacity of the flash memory 210. According to the capacity of the first blocks 231 and the second blocks 232, the processing unit 221 defines some of the memory blocks 212 to be the first blocks 231, and defines the rest of the memory blocks 212 to be the second blocks 232. The processing unit 221 can then format the first blocks 231. The first block 231 is what an application device can access, and the second block 232 is a back-up.

The capacity of every memory block 212 can be 4K bytes or 512 bytes predeterminedly, or be designed according to various application requirements. The processing unit 221 defines a ratio of the quantity of the first blocks 231 to the quantity of the second blocks 232. The ratio can be a default value or can be defined according to a total capacity of the flash memory 210, where the total capacity herein does not include the total capacity of the faulty blocks. The ratio can be defined by user when the flash memory arrangement procedure 224 is performed.

Assume that the flash memory 210 has a 2 G Bytes capacity and the memory block 212 has a 16K Bytes capacity each. When every memory block 212 is normal, the ratio of the quantity of the first blocks 231 to the quantity of the second blocks 232 will be 99:1, that is, the flash memory 210 can be divided into 131072 memory blocks 212, which is expressed as follows.

$$\frac{2*1024*1024}{16} = 131072 \quad (1)$$

Figure 3B:
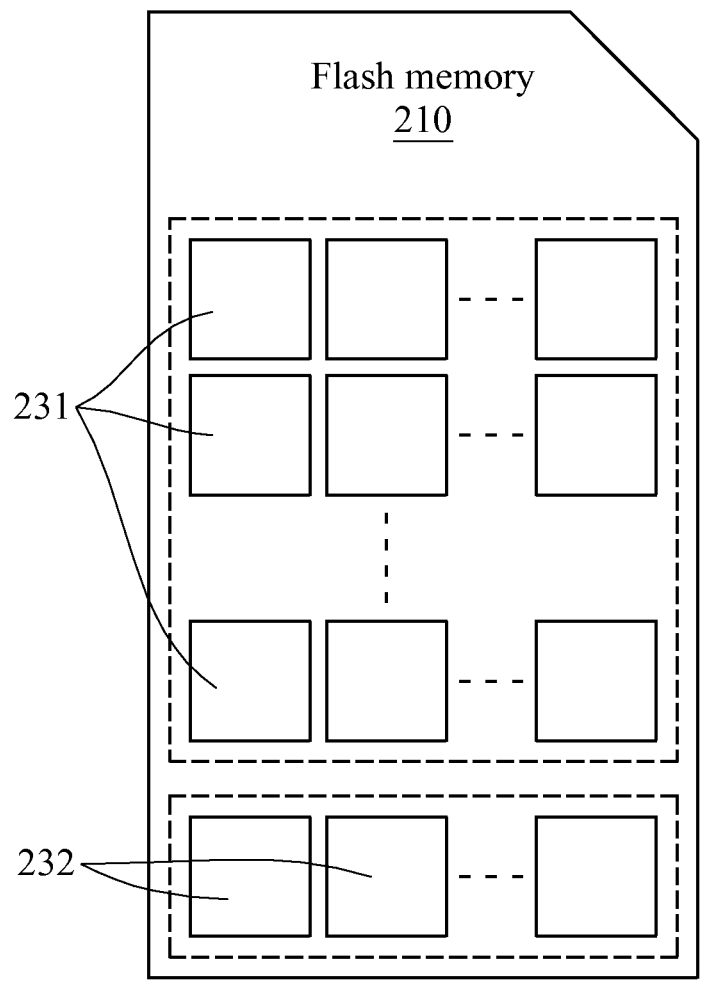
FIG. 3B is a schematic diagram of setting memory blocks of the flash memory according to an embodiment of the disclosure.

Then, the processing unit 221 sets some of the memory blocks 212 to be the first blocks 231 and sets the rest of the memory blocks 212 to be the second blocks 232 according to the ratio. Thus, as shown in FIG. 3B, a quantity of the second blocks 232 will be 1310, and the remaining 129762 memory blocks 212 will be set as the first blocks 231, where the quantity of the second blocks 232 is rounded down. Then, the processing unit 221 decides whether to format the first blocks 231.

Refer to FIG. 4A, after the flash memory arrangement procedure 224 ends, the image recorder 220 captures an object to output a target image file and starts to access the flash memory 210, that is, to write the target image file into the flash memory 210 (step S420). When the target image file is being written into the flash memory 210, the control unit 211 meanwhile performs the faulty block detection procedure 214 to detect whether the first block 231 into which the processing unit 221 or the control unit 211 tries to write a piece of data of the target image file is faulty, that is, to detect if this first block 231 is a faulty block 480, as shown by a dotted line block in FIG. 4B (step S430). In this and some embodiments, the disclosure can use algorithms such as the error correcting coding (ECC) to detect faulty blocks according to various types of the flash memory 210.

If the first block 231 is normal, the processing unit 221 writes a piece of data of the target image file into the first block 231 via the control unit 211 (step S440). When the processing unit 221 has not discovered any faulty block 480 in the first blocks 231 yet, the data of the target image file will be written into the memory blocks 212 randomly or sequentially. On the other hand, the control unit 211 records the information about the written memory blocks 212 into the data accessing structure mapping table 213 in order to maintain the continuity of the data of the target image file. When every piece of the data of the target image file is written into the first blocks 231, the control unit 211 will record the order of the written memory blocks 212 into the data accessing structure mapping table 213.

Figure 4B:
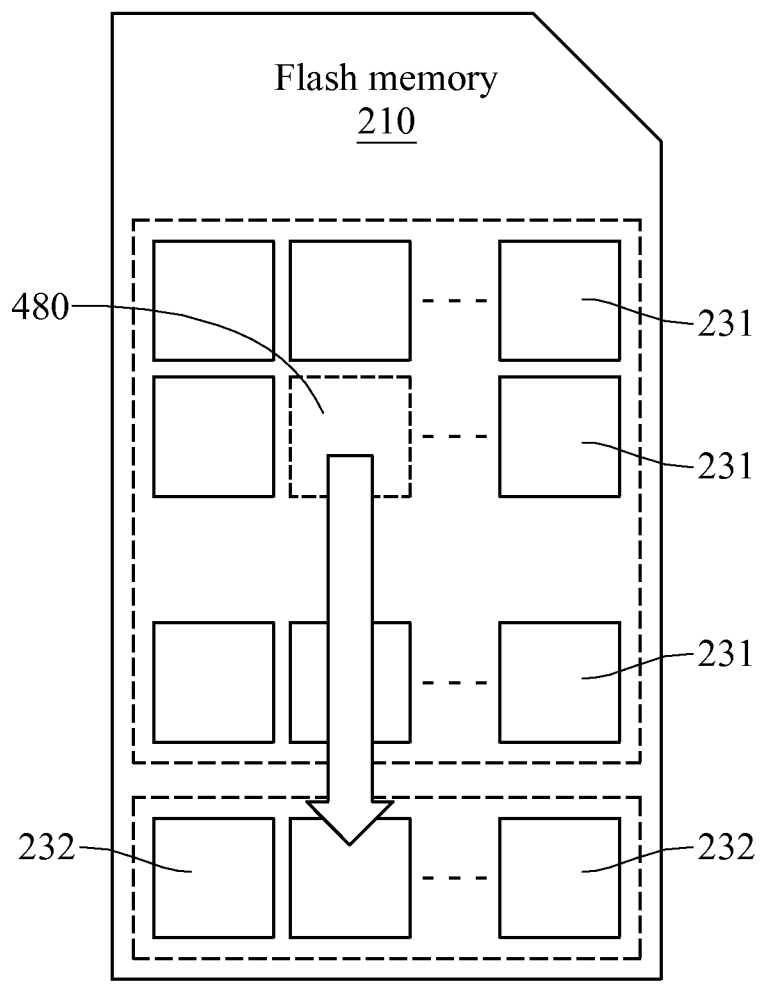
FIG. 4B is a schematic diagram of logically replacing one faulty block with one normal block in the flash memory according to an embodiment of the disclosure.

If discovering that one faulty block 480 exists in the first blocks 231, the control unit 211 will select a normal second block 232 and write this piece of data into the selected second block 232 instead of the faulty block 480 as shown in FIG. 4B (step S450). Then, the control unit 211 records the faulty block 480 into the data accessing structure mapping table 213 (step S460) and checks whether or not the entire target image file has been written into the flash memory 210 (step S470). If the entire target image file has been written into the flash memory 210, the data accessing method finishes (step S480); otherwise, the control unit 211 successively performs the detection of faulty block and the writing of data (step S430) until the entire target image file is written into the flash memory 210.

The disclosure provides the image recording system 200 and the data accessing method therefore is capable of avoiding the flash memory 210 from recording data into the faulty block 480. In this way, the data stored in the flash memory 210 can successfully be read out afterward.

What is claimed is:

1. An image recording system, comprising:
a flash memory comprising a control unit and a plurality of memory blocks and storing a faulty block detection procedure, wherein some of the memory blocks are set as first blocks, and the other memory blocks are set as second blocks, a ratio of a quantity of the first blocks to a quantity of the second blocks is set according to a total capacity of the flash memory, and a total capacity and the quantity of the first blocks and a total capacity and the quantity of the second blocks are reset in a flash memory arrangement procedure; and
an image recorder connecting to the flash memory and comprising a processing unit, a capturing unit and a storage unit, the capturing unit being configured to capture an object to output a target image file, and the processing unit connecting to the capturing unit and the storage unit and being configured to write the target image file into the first blocks;
wherein when the target image file is being written into the flash memory, the control unit performs the faulty block detection procedure to detect whether a first block into which the processing unit tries to write a piece of data of the target image file is faulty; and when the first block is faulty, the control unit selects normal one of the second blocks and writes the piece of the data of the target image file into the selected second block instead of the first block; and
wherein the second blocks are back-up blocks for the first blocks, and the total capacity of the flash memory does not include a total capacity of faulty block.

2. The image recording system according to claim 1, wherein the storage unit further stores the flash memory arrangement procedure, and when the flash memory connects to the image recorder, the processing unit performs the flash memory arrangement procedure on the flash memory to arrange the memory blocks.

3. The image recording system according to claim 2, wherein the flash memory further stores a data accessing structure mapping table which is updated to record an order of writing the target image file into the memory blocks.

4. The image recording system according to claim 3, wherein the control unit records the faulty first block into the data accessing structure mapping table after the piece of the data of the target image file is written into the selected second block, and then the processing unit writes the rest of the data of the target image file into the other first blocks.

5. An image recorder, adapted to access a flash memory which comprises a plurality of memory blocks, and comprising:
a storage unit;
a capturing unit, configured to capture an object to output a target image file; and
a processing unit, connecting to the capturing unit and the storage unit and configured to write the target image file into the memory blocks;
wherein some of the memory blocks are set as first blocks into which the processing unit writes the target image file, and the other memory blocks are set as second blocks, a ratio of a quantity of the first blocks to a quantity of the second blocks is set according to a total capacity of the flash memory, and a total capacity and the quantity of the first blocks and a total capacity and the quantity of the second blocks are reset in a flash memory arrangement procedure; when the target image file is being written into the flash memory, the flash memory detects whether a first block into which the processing unit tries to write a piece of data of the target image file is faulty; and when the first block is faulty, a control unit in the flash memory selects normal one of the second blocks and then writes the piece of the data of the target image file into the selected second block instead of the first block; and
wherein the second blocks are back-up blocks for the first blocks, and the total capacity of the flash memory does not include a total capacity of faulty block.

6. The image recorder according to claim 5, wherein the storage unit further stores the flash memory arrangement procedure, and when the flash memory connects to the image recorder, the processing unit performs the flash memory arrangement procedure on the flash memory to arrange the memory blocks.

7. The image recorder according to claim 6, wherein the flash memory updates a data accessing structure mapping table and records an order of writing the target image file into the memory blocks.

8. The image recorder according to claim 7, wherein after the piece of the data of the target image file is written into the selected second block, the control unit records the faulty first block into the data accessing structure mapping table, and then the control unit writes the rest of the data of the target image file into the other first blocks.

9. A data accessing method, comprising:
- setting some of a plurality of memory blocks of a flash memory to be first blocks, and setting the other memory blocks to be second blocks, wherein a ratio of a quantity of the first blocks to a quantity of the second blocks is set according to a total capacity of the flash memory, and a total capacity and the quantity of the first blocks and a total capacity and the quantity of the second blocks are reset in a flash memory arrangement procedure;
- obtaining a target image file from an image recorder and writing the target image file into the first blocks; and
- detecting whether a first block into which a piece of data of the target image file is written is faulty, via a control unit of the flash memory when the target image file is being written into the flash memory, wherein when the first block is faulty, the control unit selects normal one of the second blocks and then writes the piece of the data of the target image file into the selected second block instead of the first block; and
- wherein the second blocks are back-up blocks for the first blocks, and the total capacity of the flash memory does not include a total capacity of faulty block.

10. The data accessing method according to claim 9, wherein when the flash memory connects to an image recorder which includes a processing unit and a storage unit which stores the flash memory arrangement procedure, the flash memory arrangement procedure is performed on the flash memory to set the memory blocks by the processing unit.

11. The data accessing method according to claim 9, further comprising:
- updating a data accessing structure mapping table, which is stored in the flash memory, to record an order of writing the target image file into the memory blocks.

12. The data accessing method according to claim 9, further comprising:
- recording the faulty first block into the data accessing structure mapping table by the control unit after the piece of the data of the target image file is written into the selected second block; and
- writing the rest of the data of the target image file into the other first blocks by a processing unit.

* * * * *